United States Patent
England

(10) Patent No.: US 9,108,142 B2
(45) Date of Patent: Aug. 18, 2015

(54) HIGH CAPACITY SOLID FILTRATION MEDIA

(71) Applicant: Purafil, Inc., Doraville, GA (US)

(72) Inventor: William G. England, Suwanee, GA (US)

(73) Assignee: PURAFIL, INC., Doraville, GA (US)

( * ) Notice: Subject to any disclaimer, the term of this patent is extended or adjusted under 35 U.S.C. 154(b) by 0 days.

(21) Appl. No.: 13/946,503

(22) Filed: Jul. 19, 2013

(65) Prior Publication Data

US 2013/0302234 A1 Nov. 14, 2013

Related U.S. Application Data

(63) Continuation of application No. 10/550,223, filed as application No. PCT/US03/37894 on Nov. 25, 2003, now abandoned.

(60) Provisional application No. 60/428,958, filed on Nov. 25, 2002, provisional application No. 60/512,841, filed on Oct. 20, 2003.

(51) Int. Cl.
| | |
|---|---|
| *B01D 53/02* | (2006.01) |
| *B01D 39/20* | (2006.01) |
| *B01D 53/48* | (2006.01) |
| *B01D 53/52* | (2006.01) |
| *B01D 53/54* | (2006.01) |
| *B01D 53/56* | (2006.01) |
| *B01D 53/58* | (2006.01) |
| *B01D 53/62* | (2006.01) |
| *B01D 53/68* | (2006.01) |
| *B01D 53/72* | (2006.01) |
| *B01J 20/04* | (2006.01) |
| *B01J 20/32* | (2006.01) |
| *B01J 20/08* | (2006.01) |
| *B01J 20/30* | (2006.01) |
| *B01J 20/12* | (2006.01) |
| *B01J 20/16* | (2006.01) |
| *B01J 20/02* | (2006.01) |

(52) U.S. Cl.
CPC ............ *B01D 53/02* (2013.01); *B01D 39/2068* (2013.01); *B01D 53/485* (2013.01); *B01D 53/52* (2013.01); *B01D 53/54* (2013.01); *B01D 53/565* (2013.01); *B01D 53/58* (2013.01); *B01D 53/62* (2013.01); *B01D 53/685* (2013.01); *B01D 53/72* (2013.01); *B01J 20/0222* (2013.01); *B01J 20/04* (2013.01); *B01J 20/043* (2013.01); *B01J 20/08* (2013.01); *B01J 20/12* (2013.01); *B01J 20/16* (2013.01); *B01J 20/3078* (2013.01); *B01J 20/3204* (2013.01); *B01J 20/3236* (2013.01); *B01D 2251/10* (2013.01); *B01J 2220/56* (2013.01)

(58) Field of Classification Search
CPC ........ B01D 53/02; B01D 53/52; B01D 53/58; B01D 2257/304; B01D 2251/2067; B01D 2259/40; B01D 2253/104; B01D 2257/708; B01D 2253/108; B01D 2311/2649; B01D 53/04; B01D 2251/10; B01D 39/2068; B01D 53/485; B01D 53/54; B01D 53/565; B01D 53/62; B01D 53/685; B01D 53/72; B01J 20/3204; B01J 20/3236; B01J 20/3078; B01J 2220/56; B01J 20/08; B01J 20/04; B01J 20/0222; B01J 20/043; B01J 20/16; B01J 20/12; B01J 53/02
USPC .............. 55/523, 524; 95/134, 136, 141, 144, 95/285; 210/502.1, 503, 506; 422/4, 5; 423/210, 224, 230, 244.02, 245.1
See application file for complete search history.

(56) References Cited

U.S. PATENT DOCUMENTS

| | | | |
|---|---|---|---|
| 2,937,215 | A | 5/1960 | Bleich et al. |
| 2,951,888 | A | 9/1960 | Carr |
| 3,049,399 | A | 8/1962 | Gamson et al. |
| 3,069,349 | A | 12/1962 | Meiners |
| 3,226,332 | A | 12/1965 | Lincoln et al. |
| 3,434,479 | A | 3/1969 | Derek |
| 3,540,998 | A | 11/1970 | Bercik et al. |
| 3,864,460 | A | 2/1975 | Connell |
| 3,957,059 | A | 5/1976 | Rainer et al. |
| 4,637,408 | A | 1/1987 | Rainer et al. |

(Continued)

FOREIGN PATENT DOCUMENTS

| | | |
|---|---|---|
| AU | 2003293118 | 5/2010 |
| CA | 2506679 | 2/2012 |
| IN | 230141 | 2/2009 |
| WO | 2004047950 | 6/2004 |

OTHER PUBLICATIONS

Brazilian Patent Application No. PI0316561-2, Notice of Allowance mailed on Oct. 30, 2012, 1 page.
Brazilian Patent Application No. PI0316561-2, Office Action mailed Dec. 19, 2011, 3 pages.

(Continued)

*Primary Examiner* — John Kim
(74) *Attorney, Agent, or Firm* — Kilpatrick Townsend & Stockton LLP

(57) ABSTRACT

A high capacity filtration media, method of preparing the media, and method of treating a fluid stream with the media are provided. The media contain a porous substrate impregnated with high concentrations of a permanganate. Preferably, the media includes a porous substrate impregnated with at least about 8% permanganate by weight. The media can optionally contain sodium bicarbonate. Improved capacity for the removal of undesirable compounds such as ethylene, formaldehyde, hydrogen sulfide and methyl mercaptan are achieved.

15 Claims, No Drawings

(56) References Cited

U.S. PATENT DOCUMENTS

| | | | |
|---|---|---|---|
| 4,717,552 | A | 1/1988 | Carnell et al. |
| 4,795,545 | A | 1/1989 | Schmidt |
| 4,830,733 | A | 5/1989 | Nagji et al. |
| 4,830,734 | A | 5/1989 | Nagji et al. |
| 5,278,112 | A | 1/1994 | Klatte |
| 5,288,306 | A | 2/1994 | Aibe et al. |
| 5,376,609 | A | 12/1994 | Guile |
| 5,403,548 | A | 4/1995 | Aibe et al. |
| 5,730,948 | A * | 3/1998 | Klatte et al. .................. 423/477 |
| 5,914,294 | A | 6/1999 | Park et al. |
| 5,942,323 | A | 8/1999 | England |
| 6,004,522 | A * | 12/1999 | England ........................ 423/230 |
| 6,171,372 | B1 | 1/2001 | Ichiki et al. |
| 6,265,024 | B1 | 7/2001 | England |
| 6,372,289 | B1 | 4/2002 | Hickman |
| 7,157,030 | B2 | 1/2007 | Rintoul |
| 7,377,963 | B2 | 5/2008 | Tanahashi et al. |
| 2007/0157810 | A1 | 7/2007 | England |
| 2008/0236389 | A1 | 10/2008 | Leedy et al. |

OTHER PUBLICATIONS

Brazilian Patent Application No. PI0316561-2, Office Action mailed on Jun. 14, 2011, 5 pages.

European Patent Application No. 03790110.5, Summons to Attend Oral Proceedings mailed on Apr. 18, 2012, 4 pages.

European Patent Application No. 03790110.5, Third Party Observations mailed on Mar. 13, 2012, 4 pages.

European Patent Application No. 03790110.5, Written Decision mailed on Oct. 16, 2012, 20 pages.

European Patent Application No. 03790110.5, Supplementary European Search Report mailed on Mar. 30, 2010, 3 pages.

European Patent Application No. 03790110.5, Office Action mailed on Oct. 5, 2010, 8 pages.

International Application No. PCT/US2003/037894, International Search Report mailed on Apr. 20, 2004, 1 page.

U.S. Appl. No. 10/550,223, Final Office Action mailed on Mar. 17, 2011, 8 pages.

U.S. Appl. No. 10/550,223, Non-Final Office Action mailed on Jun. 25, 2010, 5 pages.

U.S. Appl. No. 10/550,223, Non-Final Office Action mailed on Oct. 12, 2011, 6 pages.

U.S. Appl. No. 10/550,223, Non-Final Office Action mailed on Mar. 20, 2009, 7 pages.

U.S. Appl. No. 10/550,223, Final Office Action mailed on Dec. 24, 2009, 12 pages.

U.S. Appl. No. 10/550,223, Final Office Action mailed on May 1, 2012, 5 pages.

U.S. Appl. No. 10/550,223, Final Office Action mailed on Nov. 21, 2012, 6 pages.

\* cited by examiner

US 9,108,142 B2

HIGH CAPACITY SOLID FILTRATION MEDIA

RELATED APPLICATIONS

The present application is a continuation of U.S. patent application Ser. No. 10/550,223, filed Jun. 9, 2006, which published as US 2007/0157810 on Jul. 12, 2007, which is a national phase of PCT/US03/37894 filed Nov. 25, 2003, which published as WO 2004/047950 on Jun. 10, 2004, which claims the benefit of U.S. Provisional Patent Application No. 60/428,958, filed Nov. 25, 2002 and U.S. Provisional Patent Application No. 60/512,841, filed Oct. 20, 2003, all of which are incorporated herein by reference in their entirety.

TECHNICAL FIELD

The present invention relates generally to a composition and method for the removal of compounds having disagreeable odors, toxic properties or corrosive properties from gaseous streams. The invention more particularly relates to the use in filter beds of a high capacity solid filtration media containing a substrate impregnated with a permanganate.

BACKGROUND OF THE INVENTION

The removal of toxic, corrosive and odorous gases can be accomplished by a number of techniques. These may include wet scrubbing, incineration, and removal via gas-phase air filtration using a variety of dry scrubbing adsorptive, absorptive, and/or chemically impregnated media. As opposed to these other methods, gas-phase air filtration does not require the consumption of large quantities water or fuel. Dry scrubbing media can be engineered from a number of common adsorbent materials with or without chemical additives for the control of a broad spectrum of gases or tailored for specific gases.

In contrast to the reversible process of physical adsorption, chemical adsorption, also referred to as chemisorption, is the result of chemical reactions on the surface of the media. This process is specific and depends on the physical and chemical nature of both the media and the gases to be removed. Some oxidation reactions can occur spontaneously on the surface of the adsorbent, however, a chemical impregnant is usually added to the media. The impregnant imparts a higher contaminant removal capacity and can lend some degree of specificity. Although some selectivity is apparent in physical adsorption, it can usually be traced to purely physical, rather than chemical, properties. In chemisorption, stronger molecular forces are involved, and the process is generally instantaneous and irreversible.

Undesirable airborne compounds, including sulfur compounds, such as hydrogen sulfide and dimethyl sulfide, ammonia, chlorine, formaldehyde, urea, carbon monoxide, oxides of nitrogen, mercaptans, amines, isopropyl alcohol and ethylene, occur in a number of environments, where most are primarily responsible for the presence of disagreeable odors, or irritating or toxic gases. Such environments include petroleum treatment and storage areas, sewage treatment facilities, hospitals, morgues, anatomy laboratories, animal rooms, and pulp and paper production sites, among others. These undesirable compounds may be bacterial breakdown products of higher organic compounds, or simply byproducts of industrial processes.

Hydrogen sulfide ("$H_2S$"), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Furthermore, $H_2S$ is flammable.

Ammonia ("$NH_3$") is also a colorless gas. It possesses a distinctive, pungent odor and is a corrosive, alkaline gas. The gas is produced in animal rooms and nurseries, and its control also has long been considered important.

Chlorine ("$Cl_2$") is a greenish-yellow gas with a suffocating odor. The compound is used for bleaching fabrics, purifying water, treating iron, and other uses. Control of this powerful irritant is necessary for the well-being of those who work with it or are otherwise exposed to it. At lower levels, in combination with moisture, chlorine has a corrosive effect on electronic circuitry, stainless steel and the like.

Formaldehyde ("$OCH_2$") is a colorless gas with a pungent, suffocating odor. It is present in morgues and anatomy laboratories, and because it is intensely irritating to mucous membranes, its control is necessary.

Urea ("$OC(NH_2)_2$") is present in toilet exhaust and is used extensively in the paper industry to soften cellulose. Its odor makes control of this compound important.

Carbon monoxide ("CO"), an odorless, colorless, toxic gas, is present in compressed breathing air. Oxygenation requirements for certain atmospheres, including those inhabited by humans, mandate its control.

Oxides of nitrogen, including nitrogen dioxide ("$NO_2$"), nitric oxide ("NO"), and nitrous oxide ("$N_2O$"), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ("$CH_3SH$"), butyl mercaptan ("$C_4H_9SH$") and methyl amine ("$CH_3NH_2$"), are undesirable gases present in sewerage odor. The control of these gases is desired for odor control.

Isopropyl alcohol ("$(CH_3)_2CHOH$") is a flammable liquid and vapor. Inhalation of the vapor is known to irritate the respiratory tract. Furthermore, exposure to high concentrations of isopropyl alcohol can have a narcotic effect, producing symptoms of dizziness, drowsiness, headache, staggering, unconsciousness and possibly death. The control of this vapor in print processing and industrial synthesis is desired.

Ethylene ("$C_2H_4$") is a colorless, flammable gas. It is a simple asphyxiant that accelerates the maturation or decomposition of fruits, vegetables, and flowers. Control of this compound prolongs the marketable life of such items.

The airborne compounds described above can have a detrimental effect on the local environment. For example, acidification is caused by emissions of sulfur dioxide and nitrogen compounds (nitrogen oxides and ammonia), which in turn cause acid rain. Furthermore, nitrogen oxides and volatile organic compounds from vehicular traffic, electricity and heat production, as well as from industrial facilities may, under certain conditions, contribute to the formation of photochemical oxidants, among which ozone is the dominating substance. Ozone is a colorless gas that forms when nitrogen oxides mix with hydrocarbons in the presence of sunlight. In addition to causing environmental damage, ozone poses a health hazard, particularly for children, the elderly and individuals with asthma or lung disease.

Attempts have been made to provide solid filtration media for removing the undesirable compounds described above from fluid, or moving, streams, such as gas or vapor streams.

Desired features of such media are a high total capacity for the removal of the targeted compound so that the media lasts longer and need not be replaced frequently, a high efficiency in removing the compound from an air stream contacting the media so that the compound is removed quickly, and a high ignition temperature (non-flammability). High capacity and high efficiency are, in turn, directly affected by the porosity and pore structure of the solid filtration media, while the capacity, efficiency and ignition temperature are all affected by the specific composition of the media.

Although a variety of permanganate-impregnated substrates are known for removing undesirable contaminants from fluid streams, these known impregnated substrates all demonstrate a limited capacity and, therefore, a low efficiency for the removal of undesirable compounds from the streams. These limitations arise to a large extent from an insufficient porosity of the solid filtration media or a clogging of pores with byproducts formed by reactions of the impregnate with the contaminant. This results in the currently available media not meeting the needs of various industries.

Therefore, what is needed is a high efficiency, high capacity, low flammability permanganate-impregnated substrate for the removal of undesirable compounds from gas streams. Such an impregnated substrate needs to be long-lasting, requiring fewer replacements and thereby minimizing replacement and maintenance costs. Also needed is a high capacity impregnated substrate that may be used in small filter beds, and therefore may allow the treatment of fluid streams where there are significant space limitations.

SUMMARY OF THE INVENTION

High capacity solid filtration media, methods of preparing the same and methods of treating a fluid stream with the solid filtration media are provided. The solid filtration media described herein are useful for removing or reducing undesirable contaminants from a gaseous fluid stream.

Generally described, the high capacity solid filtration media include a porous, impregnated substrate having high levels of impregnate. The impregnate is a permanganate, preferably a permanganate salt having high water solubility, such as sodium permanganate or lithium permanganate. A gas-evolving or gas-producing material such as sodium bicarbonate may also be included in the media. In contrast to presently available filtration media, the high capacity solid filtration media described herein contain levels of permanganate approximately 8% or higher, thereby providing an increased efficiency for removing undesirable gaseous compounds from a fluid stream, particularly compounds such as ethylene, formaldehyde and methyl mercaptan from gaseous streams by exhibiting a higher capacity for contaminant. For example, when used to remove ethylene from a gaseous stream, the media described herein utilizing sodium permanganate have an ethylene capacity of approximately 9%, whereas currently available potassium permanganate-impregnated media exhibit a maximum ethylene capacity of only approximately 3%.

The present invention addresses an existing need in the industry by providing a high capacity, low flammability permanganate-impregnated substrate for the removal of undesirable contaminants from gas streams. The permanganate-impregnated substrate provides a long lasting filtration media that can be replaced less frequently, thereby minimizing maintenance and replacement costs. Due to its high capacity, the impregnated substrate described herein may be used in small filter beds, thereby allowing the treatment of fluid streams where significant space limitations exist. The filtration media described herein yield an equivalent or superior capacity over activated carbon adsorbents and are much less expensive and considerably less flammable than activated carbon adsorbents.

Generally described, the filtration media contain at least approximately 8% by weight of media composition of a permanganate, wherein the permanganate has a higher solubility in water than that of potassium permanganate, and a porous substrate, wherein the permanganate impregnates the porous substrate. The composition typically also contains at least approximately 5% water by weight of media composition. Preferably, the permanganate is a highly water soluble permanganate salt such as sodium permanganate or lithium permanganate. The porous substrate is typically selected from, but not limited to, activated alumina, silica gel, a zeolite, adsorbent clay, kaolin, activated bauxite, or combinations thereof, the preferred porous substrate being alumina or an alumina-zeolite mix.

Preferred solid filtration media contain from approximately 8 to approximately 25% permanganate, between approximately 5 and 25% water, and a porous substrate. More preferred solid filtration media contain from approximately 15 to approximately 20% permanganate, between approximately 5 and 25% water, and a porous substrate. Most preferably, the solid filtration media contain from approximately 18 to approximately 19% permanganate, between approximately 5 and 25% water, and a porous substrate. All of the above percentages are by weight of the entire composition and, as described above, the permanganate has a higher solubility in water than that of potassium permanganate.

In another embodiment, the media further contains a gas-evolving material, such as a carbonate compound, a bicarbonate compound, or a combination thereof, that function by producing a gas (typically $CO_2$) upon heating. For example, when the composition further contains sodium bicarbonate, the sodium bicarbonate is present between approximately 5 to 25%, and preferably is between about 15 to 20% by weight of the entire composition.

The high capacity solid filtration media composition described above are produced by mixing water, a permanganate, and a substrate, and then forming the mixture into at least one cohesive porous unit. The unit is then cured at a temperature of from about 100° F. to about 200° F., until the concentration of water is at least about 5% by weight of the composition, and the concentration of the permanganate is at least about 8% by weight of the composition.

In accordance with a preferred method of making the solid filtration media, an aqueous solution containing the permanganate is sprayed onto the porous substrate. In an alternative aspect, water is combined with a dry mixture containing the permanganate and the substrate. In yet another aspect, an aqueous solution containing the permanganate is sprayed onto a dry mixture containing the permanganate and the substrate. Optionally, sodium bicarbonate may be added either to the dry mixture, to the water, or to both in the method of preparing the filtration media.

Preferably, the unit formed as described above is cured until the concentration of water is from about 5 to about 25% by weight of the composition, and the concentration of the permanganate is from about 8 to about 25% by weight, of the composition. Preferably, where sodium bicarbonate has been added to the composition, the unit formed is cured until the concentration of sodium bicarbonate is between 15 to 20% by weight. More preferably, the unit is cured until the concentration of the permanganate is from about 15 to about 20% by weight of the composition. Most preferably, the unit is cured until the concentration of the permanganate is from about 18 to about 19% by weight of the composition.

Yet another aspect of the present invention is a method of treating a contaminated fluid stream with the high capacity solid filtration media described herein. This method comprises contacting the contaminated fluid stream with the solid filtration media to remove contaminant.

The high capacity filtration media, the method of preparation, and the method of use provide improved efficiency and capacity in removing contaminants, particularly odor-causing contaminants, from gas streams.

Accordingly, it is an object of the present invention to provide a high capacity solid filtration media that efficiently removes undesirable compounds from an air stream to reduce odors, minimize the corrosion of metals or electronics, and to provide a nontoxic or nonirritating breathing environment for humans and animals.

It is another object of the present invention to provide a high capacity solid filtration media that is long-lasting and requires minimal maintenance or replacement.

It is yet another object of the present invention to provide a solid filtration media having a high ignition temperature, and therefore, limited flammability.

It is also an object of the present invention to provide an improved solid filtration media that is inexpensive to manufacture and use.

It is another object of the present invention to provide a solid filtration media having such a high capacity for removing undesirable compounds that less media needs to be utilized, therefore allowing the use of smaller air filtration units.

It is yet another object of the present invention to provide a simple, inexpensive method of making an improved solid filtration media having a high efficiency and a high total capacity for the removal of an undesirable compound.

It is a further object to provide a rapid, efficient and inexpensive method of treating a contaminated air or gas stream with a solid filtration media.

These and other objects, features and advantages of the present invention will become apparent after a review of the following detailed description of the disclosed embodiments and the appended claims.

DETAILED DESCRIPTION

High capacity solid filtration media, methods of preparing the same, and methods of treating a fluid stream with the solid filtration media are provided. The solid, filtration media can be used to remove or reduce undesirable compounds, or contaminants, from a gaseous fluid stream. The solid filtration media contain permanganate and a porous substrate. Typically, the media also contain water. A gas-evolving material such as sodium bicarbonate may also be included. In some embodiments, at least one zeolite is optionally included in the media. The media contain significantly higher levels of permanganate than previously believed to be possible.

Generally described, the filtration media contain a substrate impregnated with high levels of permanganate. The permanganate is a highly water soluble permanganate having a solubility in water greater than that of potassium permanganate. The filtration media include at least about 8% permanganate by weight of the composition. The permanganate is preferably a permanganate salt such as, but not limited to, sodium permanganate ("$NaMnO_4$"), magnesium permanganate ("$Mg(MnO_4)_2$"), calcium permanganate ("$Ca(MnO_4)_2$"), barium permanganate ("$Ba(MnO_4)_2$"), and lithium permanganate ("$LiMnO_4$"). More preferably, the permanganate salt is sodium permanganate (commercially available from chemical suppliers such as Carus Chemical Co., Peru, Ill.) or lithium permanganate. Most preferably, the permanganate is sodium permanganate due to its inexpensive commercial availability. The concentration of the permanganate in the media is typically from about 8 to about 25%, more preferably from approximately 15 to approximately 20%, and most preferably from approximately 18 to approximately 19%, by weight of the composition.

The porous substrate may be selected from the group consisting of, but not limited to, activated alumina ($Al_2O_3$) (UOP Chemical, Baton Rouge, La.), silica gels (J. M. Huber, Chemical Division, Havre De Grace, Md.), zeolites (Steel Head Specialty Minerals, Spokane, Wash.), kaolin (Englehard Corp., Edison, N.J.), adsorbent clays (Englehard Corp., Edison, N.J.), and activated bauxite. A preferred porous substrate is alumina. Preferably, the concentration of substrate in the filtration media is from about 40 to 80%, and most preferably is from about 60 to 75% in the absence of sodium bicarbonate and from about 40 to 60% if the media contain sodium bicarbonate.

Another preferred porous substrate is a combination of alumina and a zeolite, in which up to about 50% by weight of the porous substrate combination is a zeolite. Though not intending to be bound by this statement, it is believed that zeolites further control the moisture content of the filtration media by attracting and holding water, which functions to keep more of the impregnate in solution. This effect, in turn, is believed to enhance the high capacity and improved efficiency of the filtration media. As used herein, the term zeolite includes natural silicate zeolites, synthetic materials and phosphate minerals that have a zeolite-like structure. Examples of zeolites that can be used in this media include, but are not limited to, amicite (hydrated potassium sodium aluminum silicate), analcime (hydrated sodium aluminum silicate), pollucite (hydrated cesium sodium aluminum silicate), boggsite (hydrated calcium sodium aluminum silicate), chabazite (hydrated calcium aluminum silicate), edingtonite (hydrated barium calcium aluminum silicate), faujasite (hydrated sodium calcium magnesium aluminum silicate), ferrierite (hydrated sodium potassium magnesium calcium aluminum silicate), gobbinsite (hydrated sodium potassium calcium aluminum silicate), harmotome (hydrated barium potassium aluminum silicate), phillipsite (hydrated potassium sodium calcium aluminum silicate), clinoptilolite (hydrated sodium potassium calcium aluminum silicate), mordenite (hydrated sodium potassium calcium aluminum silicate), mesolite (hydrated sodium calcium aluminum silicate), natrolite (hydrated sodium aluminum silicate), amicite (hydrated potassium sodium aluminum silicate), garronite (hydrated calcium aluminum silicate), perlialite (hydrated potassium sodium calcium strontium aluminum silicate), barrerite (hydrated sodium potassium calcium aluminum silicate), stilbite (hydrated sodium calcium aluminum silicate), thomsonite (hydrated sodium calcium aluminum silicate), and the like. Zeolites have many related phosphate and silicate minerals with cage-like framework structures or with similar properties as zeolites, which may also be used in place of, or along with, zeolites. These zeolite-like minerals include minerals such as kehoeite, pahasapaite, tiptopite, hsianghualite, lovdarite, viseite, partheite, prehnite, roggianite, apophyllite, gyrolite, maricopaite, okenite, tacharanite, tobermorite, and the like.

The concentration of water in the filtration media is typically at least approximately 5 to 25%, preferably from approximately 10 to 25%. One of ordinary skill in the art will understand that the concentration of free water in the filtration media may be altered by the conditions present, such as the humidity and the temperature, during its storage and use.

Preferably, the solid filtration media includes from approximately 8 to 25% permanganate, from about 5 to 25% water, and from approximately 40 to 80% substrate, by weight of the composition. More preferably, the media contain from approximately 15 to 20% permanganate, from approximately 5 to 25% water, and from approximately 40 to 80% substrate, by weight. Most preferably, the solid filtration media contain from approximately 18 to 19% permanganate, from approximately 10 to 25% water, and from approximately 40 to 60% substrate, by weight. As described above, the permanganate is ideally sodium permanganate due to its high solubility in water and inexpensive commercial availability.

The gas-evolving material of the filtration media described herein is a material that produces or releases a gaseous substance upon heating, for example during the curing step of forming the filtration media. The bubbles formed in this heating process are instrumental in enhancing and controlling the pore structure of the filtration media. The gas-evolving material is usually selected from a carbonate compound, a bicarbonate compound, or a combination thereof, that functions by producing carbon dioxide gas upon heating. A preferred gas-evolving material is sodium bicarbonate, because of its smooth release of carbon dioxide, and its relatively low cost. However, other bicarbonates and carbonates can be used in this media, the selection of which is understood by one of ordinary skill in the art. The number and size of the pores produced from heating the gas-evolving material is related to the concentration of the gas-evolving material in the solid filtration media, the temperature of curing, and the time of curing. Thus, increasing the concentration of sodium bicarbonate in the composition increases the pore size and number, helps reduce and prevent clogging of the pore structure, enhances the retention of water, and sustains the concentration of the permanganate in the filtration media.

In a preferred embodiment, the filtration media composition includes a permanganate, water, a substrate and sodium bicarbonate ("NaHCO$_3$") (Rhone-Poulenc, Chicago Heights, Ill.), wherein the concentration of sodium bicarbonate is from approximately 5 to 25%, and preferably from 15 to 20%, by weight. In the embodiments where the filtration media contain sodium bicarbonate, the preferred concentration of alumina is from approximately 40 to 60%.

It is to be understood that, when referring to the relative weight of components, the water referred to in the present specification, examples, and tables is defined as the free water, and does not include the bound water in the substrate. Free water is driven off by an oven at approximately 200° F., but if left in the substrate it is available for the oxidation reaction. In contrast, bound water is not driven out or evaporated except by a kiln at about 1800 to 2000° F., and the bound water functions by holding the substrate together. Bound water is not available for reaction with the undesirable contaminants.

It is also to be understood that the term permanganate as used quantitatively in the present specification, examples, and tables represents the permanganate salt, not the permanganate ion, MnO$_4^-$. Therefore, the percent ranges of permanganates in compositions in the present specification denote the percent of the permanganate salt in the composition, not the percent of the permanganate ion in the composition.

Terms such as "filtration media", "adsorbent composition," "chemisorbent composition," and "impregnated substrate" are all interchangeable, and denote a substance that is capable of reducing or eliminating the presence of unwanted contaminants in fluid streams by the contact of such a substance with the fluid stream. It is to be understood that the term "fluid" is defined as a liquid or gas capable of flowing, or moving in a particular direction, and includes gaseous, aqueous, organic containing, and inorganic containing fluids.

Solid Filtration Media Preparation Methods

Also provided is a method of preparing high capacity solid filtration media. The method includes mixing water, a permanganate, an optional gas-evolving material, and a porous substrate, and then forming the mixture into at least one cohesive porous unit. The unit is then typically cured at a temperature of from about 100° F. to about 200° F., until the concentration of water is at least about 5% by weight of the composition, and the concentration of the permanganate is at least about 8% by weight of the composition. The size and shape of the cohesive porous unit is not critical. Any size and shape of a porous unit known in the art to reduce or eliminate undesirable contaminants from fluid streams when in contact with the unit may be used. Preferably, the porous unit is a nominal ⅛" diameter round pellet.

The method provided herein preferably includes forming an aqueous solution containing the permanganate and optional gas-evolving material and then mixing the aqueous permanganate solution with the porous substrate. To dissolve and maintain the permanganate in solution, the aqueous solution should be heated to approximately 160° to 200° F., and preferably to approximately 180° to 190° F.

In another embodiment, the method includes forming a dry mixture containing the permanganate and the porous substrate, and then adding water to the dry mixture. In yet another embodiment, the method includes forming a dry mixture containing the permanganate, the optional gas-evolving material, and the porous substrate; forming a separate aqueous solution containing the permanganate and the optional gas-evolving material, and then mixing the aqueous solution with the dry mixture. Optionally, the gas-evolving material such as sodium bicarbonate may be added either to the dry mixture, to the water, or to both in the above methods of preparing the filtration media.

Preferably, the unit formed is cured until the concentration of water is from about 5 to about 25%, most preferably from about 10 to about 25% by weight of the composition; the concentration of the permanganate is at least about 8 to about 25% by weight of the composition, more preferably from about 15 to about 20%, and most preferably from about 18 to about 19%; and the concentration of the gas-evolving material is from about 5 to about 25% by weight of the composition, most preferably from about 15 to 20% by weight of the composition, after curing. The presence of a gas-evolving material such as sodium bicarbonate allows for a lower curing temperature, such as about 130° to 140° F., in contrast to the conventional curing temperature of about 200° F.

The impregnation treatment of the activated starting material in accordance with the present method has not been found to be critical with respect to the particular sequence in which the dry mix is impregnated with moisture and impregnates. The above combinations may be mixed in any manner which effectively produces the desired filtration media. Impregnation may be carried out simply by immersing and soaking the solid combination in a volume of impregnate solution. Also, the impregnate solution may be passed through the combination rather than being used as a static immersion treatment. However, it has been found that a preferred method of impregnation is spray addition in which an impregnate solution is sprayed onto a dry combination being tumbled in a mixer. This method of impregnation has been described in U.S. Pat. No. 3,226,332, which is herein incorporated by reference in its entirety. Other methods of impregnating the combinations will suggest themselves as equally appropriate, and these are included within the scope of the present method.

In one embodiment utilizing the above spray addition method, the aqueous impregnate solution of permanganate is sprayed onto a dry combination of gas evolving material, such as sodium bicarbonate, and a porous substrate, such as activated alumina. For example, the dry combination preferably contains between approximately 80 to 85% activated alumina and between approximately 15 to 20% of sodium bicarbonate.

The concentration of the permanganate may vary in the solution to be sprayed onto the dry combination. For example, to produce a solid filtration, medium containing approximately 20% permanganate, an aqueous solution containing approximately 40% of permanganate, at between approximately 160° F. to 200° F., and preferably at about 180° F. to 190° F. should be sprayed on the dry combination of gas-evolving material and porous substrate being tumbled in a mixer. Also, to produce a solid filtration medium containing approximately 8-9% permanganate, a solution of approximately 18% permanganate at between approximately 160° F. to 200° F., and preferably at about 180° F. to 190° F. should be sprayed on the dry combination of gas-evolving material and porous substrate being tumbled in a mixer. Any concentration of permanganate in the aqueous solution which is effective to yield the composition described herein may be used. Further, where the permanganate is either in the dry feed mixture or in both the aqueous solution and the dry feed mixture, any concentration of permanganate in the dry mixture and/or the aqueous solution which is effective to produce the composition described herein may be used. For example, the media may be used to fill perforated modules to be inserted into air ducts in a manner known in the art.

Contaminant Removal Methods

Also provided is a method of treating a contaminated fluid stream using the high capacity solid filtration media described herein or produced by the process described above. This method involves contacting the contaminated fluid stream with the solid filtration composition provided herein. Typically, the undesired contaminants will be removed from air, especially from air admixed with effluent gas streams resulting from municipal waste treatment facilities, paper mills, petrochemical refining plants, morgues, hospitals, anatomy laboratories, and hotel facilities, and so forth. Methods of treating gaseous or other fluid streams are well known in the art. As the method of treating fluid streams is not critical to the present invention, any method known in the art of treating fluid streams with the media described herein may be used.

The composition described herein is useful for removing undesired contaminants from gaseous streams. Undesirable airborne compounds to be removed using the high capacity filtration media include, but are not limited to, sulfur compounds (such as hydrogen sulfide and dimethyl sulfide), ammonia, chlorine, formaldehyde, urea, carbon monoxide, oxides of nitrogen, mercaptans (such as methyl mercaptan), amines, isopropyl alcohol and ethylene. Typically, contaminants to be removed by employing the media described herein include, but are not limited to, ethylene, formaldehyde and methyl mercaptan The concentrations of undesirable contaminants in the gaseous streams is not considered critical to the process of contaminant removal, nor is the physical and chemical makeup of the gas stream considered critical. Even concentrations of these undesirable compounds in gas streams resulting in levels lower than one ppb of the compounds passing through a solid filtration media bed per minute may be removed.

However, it has been found that flow rates of the gas stream being contacted with the bed of filtration media affect the breakthrough capacities of the media. The preferred flow rate is between 10 and 750 ft/min, and most preferably is between 60 and 100 ft/min, flowing perpendicularly to the face of the bed.

While not intending to be bound by the following statement, it is believed that it may be necessary that certain oxidizing conditions prevail while using the solid filtration media described herein. The extent of oxidation may affect the degree of purification achieved. Preferably, oxygen is present in the gas stream being treated, at least in small amounts. This oxygen content is readily found in the gas stream, if air constitutes a sufficient portion of the gas stream being treated. If oxygen is totally absent or present in insufficient amounts, oxygen may be independently introduced into the gas stream being treated. A number of factors affect the amount of oxygen, which may be required for maximum removal of the contaminants in a gas stream in accordance with the present method, including the concentration and absolute amount of compounds being removed from the gas stream being treated.

With respect to the amount of compound removed, it is believed that the following factors affect the process: the basic degree of attraction of the activated substrate for the compound; the pore structure and pore size distribution; the size of the substrate; the specific surface area of the substrate as affected by the number and size of pores; the surface characteristics of the substrate; the amount of permanganate present; the amount of gas-evolving material present in the composition, which affects the number, size, and perhaps structure of pores; and the amount of water present.

The filtration media provided herein is appropriately used alone in filter beds for the removal of undesirable compounds. It is also appropriate, however, to use the composition in conjunction with filter beds containing other filtration media, and also in conjunction with mechanical or electrostatic filters. Any such additional filters may be placed either upstream (before the media described herein with respect to the effluent gas being treated) or downstream.

The above invention significantly increases the efficiency and capacity of impregnated porous substrates (filtration media) to remove certain undesired compounds from gaseous streams over the capacity of impregnated substrates currently available. Therefore, the lifetime of a specific quantity of the high capacity filtration media will be much longer than the same quantity of the currently available filtration media.

The extension of the lifetime of the filtration products will significantly reduce the purchasing, servicing, and installation costs of consumers and businesses. Also, the enhanced efficiency of the media allows for a new line of products, which are compact versions of currently available units, but have the same performance as the larger, currently available units. The capability of creating significantly smaller filtration units is useful for providing efficacious air filtration in space-limited quarters, which previously could not utilize the larger, currently available units.

Also, the filtration media described herein is less expensive than other filtration media having a roughly equivalent capacity. For example, the media of the present invention has a capacity equivalent or superior to the contaminant capacity of activated carbon adsorbents, particularly in respect to ethylene and formaldehyde contaminants. However, the media provided herein is considerably less expensive than activated carbon adsorbents.

Further, the filtration media provided herein is safe as it is not flammable, in contrast to carbon-containing filtration products. This characteristic of the presently provided filtration media is significant to industries that manufacture or process flammable, fume producing materials, such as the petroleum industry for example.

In the high capacity filtration media described herein, the use of a highly water soluble permanganate, having a water solubility higher than that of potassium permanganate, allows for an increase in the concentration of permanganate in the media. This increased concentration of permanganate greatly increases the removal capacity of the media for contaminants. When performing accelerated capacity tests as described in the examples below, the filtration media is examined at 100% efficiency until the efficiency drops to a pre-determined level, in this case 99.5% efficiency. Once this breakthrough is achieved the test is complete, and removal capacity can then be calculated. The capacity level is inherently linked to efficiency, because it is determined in association with the time taken for the efficiency to drop to 99.5%. Currently available potassium permanganate impregnated alumina media has a capacity of approximately 3% for the removal of ethylene. In contrast, the high capacity filtration media described herein containing approximately 60% activated alumina, approximately 15-20% water, and 19-20% sodium permanganate, exhibited an ethylene capacity of approximately 9%. Capacity tests were performed by challenging a known quantity of the selected solid filtration media with 1.0% (by volume) ethylene gas at a constant flow rate and monitoring the concentration of ethylene in the gas stream exiting the solid filtration media. The accelerated removal capacity test is fully described in U.S. Pat. No. 6,004,522, which is herein incorporated by reference in its entirety.

The high capacity of the solid filtration media described herein is not limited to the removal of ethylene from a gaseous stream. Indeed, high capacity is similarly achieved for other gaseous contaminant such as hydrogen sulfide, formaldehyde and methyl mercaptan. The results of these investigations are presented in the Examples, below.

Although the precise mechanisms by which the high capacity media operates are not understood or fully appreciated, and its scope is not bound by the following theory, it is believed that the oxidation reactions between the permanganate and the undesirable contaminants occur primarily near the surface of the filtration media, rather than deep within its pores. Therefore the media most likely perform at optimal levels when the oxidative capabilities of the surface are continually regenerated. It is believed that the oxidative capability of the surface of the media is regenerated by the flow or migration of permanganate from the center of the media to the surface of the media while the products of the oxidation reactions flow or migrate from the surface of the media to the center of the media. It is also believed that the higher the concentration of permanganate at the surface of the media, the higher the capacity and efficiency of the media.

Furthermore, the fluidity of the permanganate solution directly affects the flow and thus the quantity of the permanganate reaching the surface of the media. Therefore, the media work well when an elevated concentration of free water is maintained in the media so that the permanganate solution maintains a high level of fluidity and readily flows to the surface of the media thereby maximizing the efficiency and capacity of the media. A liquid path thus should be established between the interior of the pores and the surface of the media. In this regard, the improved pore structure provided by the addition of a gas-evolving material to the filtration media is believed to enhance the ready flow of permanganate solution. This is contrary to conventional theories, which teach a need for penetration of the gaseous contaminants into the pores of the substrate.

This theory, presented above, explains why the capacity and efficiency of the traditional filtration media could not surpass the capacity and efficiency obtained at the potassium permanganate concentrations of 4-5%. As stated above, previously, various attempts were made to impregnate the media with higher quantities of potassium permanganate, however, the majority of the free water has always been removed from these media. The efficiency and capacity of these highly impregnated potassium permanganate media remained constant or decreased relative to the capacity achieved by media impregnated with 4-5% permanganate. There are three reasons for the failure of the highly impregnated media currently available to obtain higher results. First, the high concentration of permanganate and the low concentration of water causes the permanganate to crystallize and clog the pores of the substrate thereby blocking the flow of permanganate to the surface of the media. Second, the crystallized permanganate remains in the center of the media and therefore cannot move to the surface of the media to oxidize contaminants. Third, it is difficult for any permanganate that may be in solution to move to the surface of the media as the permanganate solution is very concentrated and has a low level of fluidity. It is for these reasons that maintaining an elevated level of water in the media is believed to be useful for improved filtration media, and is included in the present invention. It is also believed that the unprecedented improvement in solid filtration media of this invention is due to recent advances in the preparation and supply of commercially available permanganates. Historically these permanganates are supplied either as granular crystals or relatively low aqueous concentrations. Potassium permanganate is known to crystallize in high concentration, as frequently demonstrated in the literature. Concentrated aqueous potassium permanganate (20%) can also precipitate during curing, and ultimately clog the pores of filtration media. However, a permanganate having a water solubility greater than that of potassium permanganate, such as sodium permanganate, is miscible in water in all proportions (by comparison, potassium permanganate solubility is approximately 6.5 g/100 ml by weight, at 20° C.). Due in part to the important difference in solubility, it is now possible to incorporate substantially higher concentrations (>20%) of permanganates, such as sodium permanganate, than previously obtained, ultimately yielding an increased removal capacity of contaminates from gaseous streams. Furthermore, the significant increase in removal capacity of ethylene contaminants is due in part to the increased concentration of permanganate, but also due to the formation of relatively small non-volatile waste products ($CO_2$ and $H_2O$) which are released from the solid filtration media, effectively providing additional active surface area for multiple reactions with other gaseous contaminants.

The following examples will serve better to illustrate the high capacity of the solid filtration media described herein for the removal of contaminants in gas streams. It should be noted that the continuous flow systems described in several of the following examples all were operated at a relative humidity of 40-50%.

Example 1

Preparation of Filtration Media Containing 13% Sodium Permanganate

A sodium permanganate impregnated alumina composition is prepared as follows.

A dried feed mix is prepared by combining, by weight, 80-85% alumina, and 15-20% sodium bicarbonate. The dry feed mixture is sprayed with a heated aqueous sodium permanganate solution at 180 to 190° F. while being tumbled in a tumble mill. The resulting pellets are dried at 130 to 140° F. until the pellets contain about 20 to 25% free water.

To prepare solid filtration media containing approximately 13% sodium permanganate by dry weight, the aqueous sodium permanganate solution preferably contains approximately 26% sodium permanganate by weight. It is to be understood that the aqueous sodium permanganate solution is sprayed onto the dry feed while the dry mix is roiled in the pelletizing disk as described in U.S. Pat. No. 3,226,332, incorporated herein by reference.

Example 2

Preparation of Filtration Media Containing 4-5% Potassium Permanganate

A 4-5% potassium permanganate impregnated alumina composition was prepared as follows.

A dry feed mix, consisting of 100% alumina, was sprayed with a heated aqueous potassium permanganate solution at 180 to 190° F. while the dried feed was tumbled in a tumble mill. The resulting pellets were then dried at 130 to 140° F. until the pellets contained about 20 to 25% free water.

To prepare solid filtration media containing approximately 4-5% potassium permanganate by thy weight, the aqueous potassium permanganate solution preferably contained approximately 10% potassium permanganate by weight. It is to be understood that the aqueous potassium permanganate solution was sprayed onto the dry feed while the dry mix was rolled in the pelletizing disk as described in U.S. Pat. No. 3,226,332.

Example 3

Preparation of Filtration Media Containing 19-20% Sodium Permanganate

A 19-20% sodium permanganate impregnated alumina composition was prepared as follows.

A dried feed mix, consisting of 100% alumina, was sprayed with a heated aqueous sodium permanganate solution at 180 to 190° F. while the dried feed was being tumbled in a tumble mill. The resulting pellets were then dried at 130 to 140° F. in air until the pellets contained about 20 to 25% free water.

To prepare a solid filtration media containing approximately 19-20% sodium permanganate, by dry weight, the aqueous solution preferably contained approximately 40% sodium permanganate, by weight. It is to be understood that the aqueous potassium permanganate solution was sprayed on to the dry feed while the dry feed was rolled in the pelletizing disk as described in U.S. Pat. No. 3,226,332.

Example 4

Preparation of Additional Permanganate-Impregnated Substrates

Using the methods described in Examples 2 and 3, above, the following compositions, by dry weight, were also prepared.

TABLE I

| Composition of Solid Filtration Media | | | | |
|---|---|---|---|---|
| Sample Number | Substrate | % $NaMnO_4$ | % $KMnO_4$ | % $H_2O$ |
| 4A | Alumina | 4-5 | 0 | 15-20 |
| 4B | Alumina | 0 | 8-9 | 15-20 |
| 4C | Alumina | 8-9 | 0 | 15-20 |

The dry feed mix, consisting of 100% alumina, was mixed in a tumbling mill and sprayed with the appropriate amount of aqueous potassium permanganate or aqueous sodium permanganate solution, while rumbling, in the manner described in U.S. Pat. No. 3,226,332, curing was carried out as in Examples 2 or 3 to provide the cured pellets as a strong, non-dusting filter media suitable for placement in filter beds.

Example 5

Standard Accelerated Test Method for Capacity Determination of Gas-Phase Air Filtration Media The following accelerated test method is useful for determining the capacity of removal of various gas-phase air filtration media when subjected to a flowing gas stream containing high levels of contaminant(s). Low-level challenge testing of gas phase air filtration media, whether full-scale or small-scale, usually takes long periods of time to obtain the desired results. The following method provides an accelerated test for determining the removal capacities of various media by exposing them to high levels of contaminants.

The method is briefly summarized as follows: a known volume of media is placed in an adsorption tube and exposed to a known concentration (usually 1% by volume) of contaminant gas(es) in a tempered, humidified, clean air system. The gas stream is calibrated to deliver a total flow rate of 1450±20 ml/min. The removal capacity is calculated as the amount (in grams) of contaminant removed from the air stream per volume (cubic centimeters) of media at a 50 parts per million ("ppm") breakthrough.

More specifically, the air utilized must be tempered, humidified, clean, oil-free, and compressed. Accordingly, the air must be passed through a bed of activated carbon followed by a filter bed containing sodium permanganate impregnated alumina pellets. Each filter bed should contain at least 300 ml (18.3 cu. in.) of media for each liter per minute (0.035 cfm) of air flow. The media in each filter bed should be changed before each test.

Media samples are preferably obtained from unopened original manufacturer's shipping or storage containers chosen at random whenever possible. The entire container, whenever possible or practical, should be sampled by taking small amounts of media from throughout the container and combining them into one larger sample. The sample should be thoroughly mixed before being analyzed. Guidance on sampling may be obtained from ASTM Standard E300, entitled Recommended Practice for Sampling Industrial Chemicals. If a test is to be run comparing media of the same size or different sizes, the sample collected may be screened through the appropriate sieves to sort the media by size.

Using an appropriate sampling method, obtain a representative sample of media (approximately 400 grams should be sufficient) and determine its apparent density as per ASTM 2854, or an equivalent method. Obtain an adsorption tube which is a cylindrical tube where glass wool and/or beads are optionally placed below the media, and the media and optional glass wool or beads are supported by stainless steel mesh, a perforated slotted glass disc, or a perforated slotted ceramic disc positioned below the media and glass wool or beads. After the adsorption tube having the glass wool or glass beads has been calibrated for the volume of a known depth of media, weigh the adsorption tube to the nearest 1.0 mg. Fill the adsorption tube to the desired depth via alternately filling and gently tamping the tube to eliminate any dead space until the desired depth is reached. Weigh the filled adsorption tube to the nearest 1.0 mg.

The filled media tube is arranged such that a mixture of air and contaminated gas enters the bottom of the tube, flows through the glass wool or beads, flows through the filtration media, and is then analyzed by a gas analyzer. Leaks in the gas system should be checked for and eliminated before beginning the analysis of the sample. Rotameters, analyzers, recorders, etc. should be calibrated over appropriate ranges according to the manufacturer's instructions or other standard methods such as ASTM Standard D3195, before any media is introduced into the system. Also, air and gas flow requirements should be determined and checked against supply capabilities to assure proper air and gas flows to the system.

Once the adsorption tube is in position, start the flow of the mixture of contaminated gas and air and record the time, or time the test using a stop watch. Continue the flow of the mixture of gas and air until a breakthrough of 50 ppm is observed or indicated by the gas analyzer. Record the time at breakthrough. It is preferable to use a gas analyzer capable of variable scale readouts to 50 ppm (±5 ppm), having specific or multiple gas capabilities.

The data obtained from the above analysis will yield the gas capacity of the media tested using the following equation:

$$\text{GAS CAPACITY} (GM/CC) = (K \times 10^{-5})(C)(F)(t_b)/V$$

where:

$K = 1.52$ for $H_2S$, 2.86 for $SO_2$, 3.17 for $Cl_2$, 2.15 for $CH_3SH$, 0.76 for $NH_3$, 2.05 for $NO_2$, 1.16 for $C_2H_4$, 1.34 for $OCH_2$, and 1.39 for NO.
C=Concentration of challenge gas in air stream, Volume %.
F=Total stream flow rate, cc/min.
$t_b$=Time to 50 ppm breakthrough, minutes.
V=Volume of the adsorption tube media column, cc.

Example 6

Capacity of Permanganate Impregnated Alumina Pellets in the Presence of $H_2S$

The results of tests comparing the capacities of various solid filtration media are summarized in Table II below. The capacity tests were performed by challenging a known quantity of the selected solid filtration media with 1.0% hydrogen sulfide gas at a constant flow rate and monitoring the concentration of hydrogen sulfide in the gas stream exiting the solid filtration media as described in Example 5.

TABLE II

Hydrogen Sulfide Capacity Tests for Various Media

| Media | % $KMnO_4$ | % $NaMnO_4$ | % $H_2S$ capacity |
|---|---|---|---|
| Example 2 | 4-5 | 0 | 8 |
| Example 3 | 0 | 19-20 | 17 |
| Sample 4A of Example 4 | 0 | 4-5 | 8 |
| Sample 4B of Example 4 | 8-9 | 0 | 16 |

TABLE II-continued

Hydrogen Sulfide Capacity Tests for Various Media

| Media | % $KMnO_4$ | % $NaMnO_4$ | % $H_2S$ capacity |
|---|---|---|---|
| Sample 4C of Example 4 | 0 | 8-9 | 16 |

Example 7

Capacity of Permanganate Impregnated Alumina Pellets in the Presence of Ethylene The results of tests comparing the capacities of various solid filtration media are summarized in Table III below. The capacity tests were performed by challenging a known quantity of the selected solid filtration media with 1.0% ethylene gas at a constant flow rate and monitoring the concentration of ethylene in the gas stream exiting the solid filtration media as described in Example 5.

TABLE III

Ethylene Capacity Tests for Various Media

| Media | % $KMnO_4$ | % $NaMnO_4$ | % Ethylene capacity |
|---|---|---|---|
| Example 2 | 4-5 | 0 | 2 |
| Example 3 | 0 | 19-20 | 9 |
| Sample 4A of Example 4 | 0 | 4-5 | 2 |
| Sample 4B of Example 4 | 8-9 | 0 | 3 |
| Sample 4C of Example 4 | 0 | 8-9 | 4 |

Example 8

Capacity of Permanganate Impregnated Alumina Pellets in the Presence of Formaldehyde The results of tests comparing the capacities of various solid filtration media are summarized in Table IV below. The capacity tests were performed by challenging a known quantity of the selected solid filtration media with 1.0% formaldehyde gas at a constant flow rate and monitoring the concentration of formaldehyde in the gas stream exiting the solid filtration media as described in Example 5.

TABLE IV

Formaldehyde Capacity Tests for Various Media

| Media | % $KMnO_4$ | % $NaMnO_4$ | % formaldehyde capacity |
|---|---|---|---|
| Example 2 | 4-5 | 0 | 2 |
| Example 3 | 0 | 19-20 | 8 |
| Sample 4A of Example 4 | 0 | 4-5 | 2 |
| Sample 4B of Example 4 | 8-9 | 0 | 3 |
| Sample 4C of Example 4 | 0 | 8-9 | 4 |

Example 9

Capacity of Permanganate Impregnated Alumina Pellets in the Presence of Methyl Mercaptan The results of tests comparing the capacity of solid filtration media of the present invention are summarized in Table V below. The capacity tests were performed by challenging a known quantity of the selected solid filtration media with 1.0% methyl mercaptan gas at a constant flow rate and monitoring the concentration of methyl mercaptan in the gas stream exiting the solid filtration media as described in Example 5.

TABLE V

Methyl Mercaptan Capacity Tests for Various Media

| Media | % KMnO$_4$ | % NaMnO$_4$ | % Methyl Mercaptan capacity |
|---|---|---|---|
| Example 2 | 4-5 | 0 | 3 |
| Example 3 | 0 | 19-20 | 11 |
| Sample 4A of Example 4 | 0 | 4-5 | 3 |
| Sample 4B of Example 4 | 8-9 | 0 | 5 |
| Sample 4C of Example 4 | 0 | 8-9 | 6 |

It should be understood, of course, that the foregoing relates only to certain embodiments of the present invention and that numerous modifications or alterations may be made therein without departing from the spirit and the scope of the invention. All of the publications or patents mentioned herein are hereby incorporated by reference in their entireties.

What is claimed is:

1. A method of treating a contaminated fluid stream comprising passing the contaminated fluid stream through a solid filtration composition such that at least one contaminant is removed from the fluid stream, wherein:
    the contaminated fluid stream is passed through the solid filtration composition at a velocity of from 10 to 750 ft/min;
    the solid filtration composition comprises particles with a nominal ⅛" particle size, the particles consisting of a dry porous substrate, a permanganate and water;
    the permanganate is a permanganate salt having a solubility in water greater than that of potassium permanganate;
    the concentration of permanganate salt in the solid filtration composition is approximately 15-20% permanganate salt by weight; and
    the porous substrate comprises activated alumina.

2. The method of claim 1, wherein the permanganate salt is selected from the group consisting of sodium permanganate, magnesium permanganate, calcium permanganate, barium permanganate, lithium permanganate and combinations thereof.

3. The method of claim 1, wherein the permanganate salt comprises sodium permanganate.

4. The method of claim 1, wherein the dry porous substrate further comprises a silica gel, a zeolite, a zeolite-like mineral, kaolin, an adsorbent clay, activated bauxite, or a combination thereof, and wherein the dry porous substrate is between about 40 and about 80% by weight of the solid filtration composition.

5. The method of claim 4, wherein the zeolite or zeolite-like mineral is selected from amicite, analcime, pollucite, boggsite, chabazite, edingtonite, faujasite, ferrierite, gobbinsite, harmotome, phillipsite, clinoptilolite, mordenite, mesolite, natrolite, garronite, perlialite, barrerite, stilbite, thomsonite, kehoeite, pahasapaite, tiptopite, hsianghualite, lovdarite, viseite, partheite, prehnite, roggianite, apophyllite, gyrolite, maricopaite, okenite, tacharanite, tobermorite and combinations thereof.

6. The method of claim 1, wherein the contaminated fluid stream is passed through the solid filtration composition at a velocity of from 60 to 100 ft/min.

7. The method of claim 1, wherein the at least one contaminant is selected from the group consisting of sulfur compounds, ammonia, chlorine, formaldehyde, urea, carbon monoxide, oxides of nitrogen, mercaptans, amines, isopropyl alcohol, ethylene and combinations thereof.

8. The method of claim 1, wherein the at least one contaminant is hydrogen sulfide and the solid filtration composition has a removal capacity of at least 8%.

9. The method of claim 1, wherein the at least one contaminant is hydrogen sulfide and the solid filtration composition has a removal capacity of at least 16%.

10. The method of claim 1, wherein the at least one contaminant is ethylene and the solid filtration composition has a removal capacity of at least 2%.

11. The method of claim 1, wherein the at least one contaminant is ethylene and the solid filtration composition has a removal capacity of at least 4%.

12. The method of claim 1, wherein the at least one contaminant is formaldehyde and the solid filtration composition has a removal capacity of at least 2%.

13. The method of claim 1, wherein the at least one contaminant is formaldehyde and the solid filtration composition has a removal capacity of at least 4%.

14. The method of claim 1, wherein the at least one contaminant is methyl mercaptan and the solid filtration composition has a removal capacity of at least 3%.

15. The method of claim 1, wherein the at least one contaminant is methyl mercaptan and the solid filtration composition has a removal capacity of at least 6%.

* * * * *